US009373090B2

(12) United States Patent
Gupta et al.

(10) Patent No.: US 9,373,090 B2
(45) Date of Patent: Jun. 21, 2016

(54) WORK-ITEM NOTIFICATION CLASSIFIER

(71) Applicant: International Business Machines Corporation, Armonk, NY (US)

(72) Inventors: Monika Gupta, New Delhi (IN); Debdoot Mukherjee, Kolkata (IN); Vibha S. Sinha, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/487,143

(22) Filed: Sep. 16, 2014

(65) Prior Publication Data

US 2015/0006448 A1  Jan. 1, 2015

Related U.S. Application Data

(63) Continuation of application No. 13/767,159, filed on Feb. 14, 2013, now Pat. No. 9,002,763.

(51) Int. Cl.
*G06N 5/04* (2006.01)
*G06N 99/00* (2010.01)
*G06Q 10/00* (2012.01)
*G06F 17/30* (2006.01)
*G06Q 10/06* (2012.01)
*H04L 29/08* (2006.01)
*G06N 5/02* (2006.01)
*G06N 5/00* (2006.01)

(52) U.S. Cl.
CPC ........ *G06N 99/005* (2013.01); *G06F 17/30643* (2013.01); *G06N 5/04* (2013.01); *G06Q 10/00* (2013.01); *G06Q 10/063114* (2013.01); *H04L 67/306* (2013.01); *G06N 5/00* (2013.01); *G06N 5/02* (2013.01); *G06N 5/022* (2013.01); *G06N 5/025* (2013.01)

(58) Field of Classification Search
None
See application file for complete search history.

(56) References Cited

U.S. PATENT DOCUMENTS

| 7,296,056 | B2 | 11/2007 | Yaung |
| 7,941,491 | B2 | 5/2011 | Sood |
| 8,126,760 | B2 | 2/2012 | Kelly et al. |
| 2005/0108074 | A1 | 5/2005 | Bloechl et al. |
| 2006/0241996 | A1 | 10/2006 | Burger et al. |
| 2007/0133781 | A1 | 6/2007 | Febonio et al. |
| 2012/0054662 | A1 | 3/2012 | Kieselbach |

OTHER PUBLICATIONS

Construction Field Services Division, Pavement Design and Selection Manual, Michigan Department of Transportation (MDOT), Feb. 9, 2012, pp. 1-50.*

(Continued)

*Primary Examiner* — Wilbert L Starks
(74) *Attorney, Agent, or Firm* — David B. Woycechowsky

(57) ABSTRACT

Embodiments of the present invention provide a system, method, and program product for predicting the classification of a work-item notification generated by an issue tracking system. A computing device analyzes a new work-item notification using a trained binary classifier that was trained using at least a past and/or current work-item history that was collected as a tuple that includes information reflecting the workitem-ID, actor, timestamp, attribute, work-item start-value, and work-item end-value. The computing device, in response to analyzing the new work-item notification, predicts a classification of the new work-item notification. In an embodiment, the classification is used for display of the new work-item notification.

6 Claims, 7 Drawing Sheets

(56) References Cited

OTHER PUBLICATIONS

Yingbo, et al., Using Decision Tree Learning to Predict Workflow Activity Time Consumption, ICEIS (2), 2007, pp. 69-75.*

Yingbo et al., "A Machine Learning Approach to Semi-Automating Workflow Staff Assignment", SAC '07, Mar. 11-15, 2007, Seoul, Korea, pp. 340-345.

"A system and method of automatic and intelligent tasks planning in Calendar". IP.com Prior Art Database Technical Disclosure. IP.com No. IPCOM000220248D. IP.com Electronic Publication: Jul. 27, 2012.

"Automated email prioritization based on integrated software development tooling". IP.com Prior Art Database Technical Disclosure. IP.com No. IPCOM000209438D. IP.com Electronic Publication: Aug. 4, 2011.

Bennett, P. and Carbonell, J. "Feature Representation for Effective Action-Item Detection". SIGIR '05, Aug. 15-Aug. 19, 2005. Salvador. Copyright 2005. ACM.

Bertram, D. "The Social Nature of Issue Tracking in Software Engineering". A Thesis Submitted to the Faculty of Graduate Studies in Partial Fulfillment of the Requirements for the Degree of Master of Science. University of Calgary. Department of Computer Science. Calgary. Dec. 2009. Copyright Dane Bertram 2009.

"Comparison of issue-tracking systems". Wikipedia, the free encyclopedia. Retrieved on: Nov. 5, 2012. <http://en.wikipedia.org/wiki/Comparision_of_issue_tracking_systems>.

Dabbish, L. et al. "Understanding Email Use: Predicting Action on a Message". CHI 2005, Apr. 2-Apr. 7, 2005. Portland. Copyright 2005. ACM.

Faulring, A. et al. "Success of an Agent-Assisted System that Reduces Email Overload". Carnegie Mellon University Research Showcase. Institute for Software Research. Paper 781. School of Computer Science. Jan. 1, 2009.

Freed, M. et al. "Radar: A Personal Assistant that Learns to Reduce Email Overload". Copyright 2008. Association for the Advancement of Artificial Intelligence.

IBM. "A System to Prioritize Work for User Driven by Business Objectives". IP.com Prior Art Database Technical Disclosure. IP.com No. IPCOM000173304D. IP.com Electronic Publication: Jul. 30, 2008.

"Method and System for Analyzing and Prioritizing Tasks of a User". IP.com Prior Art Database Technical Disclosure. IP.com No. IPCOM000210095D. IP.com Electronic Publication: Aug. 25, 2011.

"Smarter search and recent object functionality" teamwork's blog work management software. Feb. 20, 2009. <http://blog.twproject.com/2009/02/20/smarter-search-and-recent-object-functionality>.

U.S. Appl. No. 13/767,159, entitled "Work-Item Notification Classifier" filed Feb. 14, 2013.

"YouTrack::Features". JetBRAINS Develop with pleasure! Retrieved on: Nov. 5, 2012. <http:www.jetbrains.com/youtrack/features/issue_tracking.html>.

* cited by examiner

FIG. 1

| Who | Subject | Date | Size |
|---|---|---|---|
| Sedna Administrator | [Work Item 3045] New: Mass Download / Upload / Re-Naming [s] | 01/20/2010 10:3 | 4K |
| Sedna Administrator | [Work Item 3051] Filtering capability in Asset Contributor [c] | 02/02/2010 01:2 | 2K |
| Sedna Administrator | [Work Item 3051] Filtering capability in Asset Contributor [c] | 02/01/2010 08:2 | 2K |
| Sedna Administrator | [Work Item 3061] Tagging repeating content via-A-HA addin [c] | 04/29/2010 12:4 | 2K |
| Sedna Administrator | [Work Item 3062] Support for harvesting ROL documents in A-HA [o] | 02/18/2010 12:4 | 2K |
| Sedna Administrator | [Work Item 3062] Support for harvesting ROL documents in A-HA [o] | 02/01/2010 08:2 | 2K |
| Sedna Administrator | [Work Item 3102] Text output that lists file names of generated artifacts and corresponding original file names [o] | 02/17/2010 07:5 | 2K |
| Sedna Administrator | [Work Item 3102] Text output that lists file names of generated artifacts and corresponding original file names [o] | 02/17/2010 07:5 | 2K |
| Sedna Administrator | [Work Item 3109] New: Headings are NOT bold [o] | 02/08/2010 09:2 | 2K |
| Sedna Administrator | [Work Item 3110] New: Tag items are NOT coming property [s] | 02/08/2010 09:3 | 2K |
| Sedna Administrator | [Work Item 3111] Embed WORD Macro in A-HA to Auto Correct Table Widths [o] | 02/17/2010 07:3 | 2K |
| Sedna Administrator | [Work Item 3111] New: Embed WORD Macro in A-HA to Auto Correct Table Widths [s] | 02/08/2010 10:3 | 3K |
| Sedna Administrator | [Work Item 3123] Long file names of assets in ReAL [c] | 02/11/2010 07:2 | 2K |
| Sedna Administrator | [Work Item 3168] Mass Conversion of ReAL assets with doc artifacts [s] | 05/24/2010 05:0 | 2K |
| Sedna Administrator | [Work Item 3168] Mass Conversion of ReAL assets with doc artifacts [s] | 05/24/2010 04:5 | 2K |
| Sedna Administrator | [Work Item 3168] Mass Conversion of ReAL assets with doc artifacts [s] | 05/24/2010 04:5 | 2K |
| Sedna Administrator | [Work Item 3168] Mass Conversion of ReAL assets with doc artifacts [s] | 05/03/2010 09:3 | 2K |
| Sedna Administrator | [Work Item 3168] Mass Conversion of ReAL assets with doc artifacts [s] | 05/03/2010 09:3 | 2K |
| Sedna Administrator | [Work Item 3168] Mass Conversion of ReAL assets with doc artifacts [s] | 03/03/2010 10:0 | 2K |
| Sedna Administrator | [Work Item 3168] Mass Conversion of ReAL assets with doc artifacts [s] | 03/03/2010 08:2 | 2K |
| Sedna Administrator | [Work Item 3168] Mass Conversion of ReAL assets with doc artifacts [s] | 03/03/2010 06:2 | 2K |
| Sedna Administrator | [Work Item 3168] New Mass Upload into Sedna7 server [s] | 02/17/2010 07:4 | 2K |
| Sedna Administrator | [Work Item 3169] Duplicate artifacts name to resolve in same project profile [s] | 02/17/2010 08:0 | 2K |
| Sedna Administrator | [Work Item 3182] Assetzing Visio PFLs [c] | 04/27/2010 02:2 | 2K |
| Sedna Administrator | [Work Item 3182] Assetzing Visio PFLs [c] | 04/23/2010 08:0 | 2K |
| Sedna Administrator | [Work Item 3182] Assetzing Visio PFLs [c] | 03/23/2010 08:3 | 2K |
| Sedna Administrator | [Work Item 3182] Assetzing Visio PFLs [c] | 03/23/2010 08:3 | 2K |
| Sedna Administrator | [Work Item 3183] PDD template is not able to capture Requirements under Step Entry [o] | 02/23/2010 09:5 | 2K |
| Sedna Administrator | [Work Item 3201] Adjust Page Sizes of Visio Files [s] | 05/19/2010 11:4 | 2K |
| Sedna Administrator | [Work Item 3201] Adjust Page Sizes of Visio Files [s] | 05/19/2010 11:4 | 2K |
| Sedna Administrator | [Work Item 3201] Adjust Page Sizes of Visio Files [s] | 05/19/2010 11:4 | 2K |
| Sedna Administrator | [Work Item 3201] Adjust Page Sizes of Visio Files [s] | 05/18/2010 09:4 | 2K |
| Sedna Administrator | [Work Item 3201] Adjust Page Sizes of Visio Files [s] | 05/17/2010 06:4 | 2K |
| Sedna Administrator | [Work Item 3201] Adjust Page Sizes of Visio Files [s] | 04/07/2010 09:0 | 2K |

FEATURE SET COMPUTED FOR USER X WHENEVER ONE OF X'S SUBSCRIBED WORK-ITEM IS UPDATE

| Title | Definition | Rationale | Available From |
|---|---|---|---|
| Is X's Name Referenced? | Is true if X's name is mentioned in a comment. Some simple heuristics are applied to ascertain whether there is a question implied for X, e.g., the sentence ends in a question mark. | If there is a question for X, it is expected that X should respond. | Action Details |
| Attributes edited in current update. | Indicates the set of work-item attributes that are being updated. E.g., severity, priority, comments. | Edit of certain attributes are more important than others. e.g., A comment is more important than a tag being added. | Action Details |
| Is X Being Added As Owner? | Checks whether the current update adds X as owner. | If X is being set as Owner, X should start acting on the work-item, at least update plans of action. | Action Details |
| Owned By X? | Indicates whether X owns the work-item. | People are more active on the items that they own. So, the probability of the getting a response from X is higher than otherwise. | Work-Item History |
| Time since X's Last Action. | Measures time elapsed since X's last action on the work-item. | If X has not acted in a long time, then probably the work-item is not of interest to X anymore. | Work-Item History |
| Is X the Last Actor? | Indicates whether X updated the work-item just before the current action. | The series of comments on a work-item can be often perceived as conversations between two or more users. So the person who puts in the last comment has a high probability of responding to the current action. | Work-Item History |
| Is X in the Last 2 Actors? | Indicates whether X updated the work-item within 2 actions of the current one. | Same Rationale as above. | Work-Item History |
| Fraction of X's Actions relative to actions from other users. | X's actions on this work-item or Actions on this work-item. | If X has been the most active user on this work-item, then X has a high probability of acting again. | Work-Item History |
| Fraction of X's Actions on this item relative to other items. | X's actions on this work-item or X's actions on all work-items. | If work-item consumes most amount of X's time, then the work-item is important to X. | User Action Profile |
| X's Affinity Toward Current Category. | Measure of X's actions on work-items having the same category as the current one, relative to those in work-items having other categories. | If work-items of this category are important to X, then it is likely that this one will also be important. | User Action Profile |
| X's Affinity Toward Current Actor. | Number of times X acted soon after actions performed by the current user (normalized suitably). | If X responds quickly to some people in the team (e.g., the client), then the notification from those users will be important to X. | User-User Relations |

WORK-ITEM NOTIFICATION CLASSIFIER

FIELD OF THE INVENTION

The present invention relates generally to the field of issue tracking, and more particularly to predicting the classification of a work-item notification generated by an issue-tracking system.

BACKGROUND OF THE INVENTION

The use of issue tracking software (ITS) to record and track the status of outstanding issues associated with a task and/or project is common place. An ITS typically creates a centralized database for tracking bugs, features, and inquiries as they progress from their initial creation to a final closed state. Examples of an ITS include bug tracking systems, help desk and service desk issue tracking systems, and asset management systems and may be implemented as a client-server application within distributed and hosted computing systems.

An ITS typically generates work items, which are artifacts that keep track of the tasks and issues that a team needs to address during a development cycle, such as a software development cycle. A work-item encapsulates all information pertaining to a single unit of work which needs to be completed for a development project and includes attributes, such as title and description, which communicate the nature of the task or issue. Further, a work-item depicts the status of the associated task at any time, tracks the effort expended on the work-item, and manages the work-item's review and approval workflow. Work items provide traceability between different reported issues. In general, a work item is an object that controls the process of performing work during, for example, software or systems development.

Work items have a life cycle, which concludes when the work item is closed (the end state). During the life cycle, a work item's state may be changed by adding data or changing the data of the work item, for example, by typing text, selecting values from a pick list, or adding attachments, by authorized persons with access control (permission) to the work item. In addition to generating work-items, an ITS typically also generates work-item notifications (hereinafter "notifications") when the authorized person enters/modifies an attribute of a work item, discussed in further detail below. Further, an ITS transmits, typically via electronic mail, the notification to the person that is primarily responsible for the work-item (hereinafter "owner") and all persons included in the subscriber list of the work item (hereinafter "subscriber"). The subscriber list is a list of persons that may contribute to the work-item.

Notifications include information regarding the updated work-item, such as who acted on the work-item, which attribute was edited, etc. Notifications can serve different purposes for different roles. Project managers may like to see many notifications to better assess activity and progress. On the other hand, some developers choose not to follow the team's individual progress (e.g. deliberately not change the status of work items to "in progress") because this often generates many notifications that only help others to track their progress, and have no perceived benefit to the developers themselves. Current approaches to ITS require the developer to manually isolate important notifications from notifications of relatively low importance.

Current ITS solutions have introduced some rudimentary measures to support personalized work-item notification generation, but these measures require manual configuration. For example, one may choose to receive notifications concerning new comments but not notifications concerning work-items status changes. However, an update of any work-item attribute may not always be considered important from a user's perspective. Another alternative for tracking work-item updates requires a user to regularly visit dashboards that show recent activity on a list of work-items selected by certain criteria (e.g., ownership, subscription status, labeled by a particular category or tag). Again, such an approach requires the user to manually browse multiple dashboards to assess which work-items need attention.

SUMMARY

Embodiments of the present invention provide a system, method, and program product for predicting the classification of a work-item notification. A computing device analyzes a new work-item notification using a trained binary classifier that was trained using at least a past and/or current work-item history that was collected as a tuple that includes information reflecting the workitem-ID, actor, timestamp, attribute, work-item start-value, and work-item end-value. The computing device, in response to analyzing the new work-item notification, predicts a classification of the new work-item notification. In an embodiment, the classification is used for display of the new work-item notification.

In certain embodiments, the trained binary classifier was trained using at least a work-item snapshot, a user profile, a description of the past and/or current work-item notification, a binary classification scheme, a user commit profile, or a user-user relationship. In an embodiment, the work-item snapshot references a work-item and includes information that describes the state of the referenced work-item at a particular point in time. In other embodiments, the user profile includes information that identifies a work-item the user owns and/or subscribes to and quantifies actions taken by the user on the work-item. In still other embodiments, the binary classification scheme is either "important or unimportant" or "relevant or non-relevant".

In an embodiment, the user commit profile is time-stamped and reflects at least a user identification, timestamp, package name, or commit number. In another embodiment, the user-user relationship profile includes information that quantifies how many times the user acts on a work-item immediately after another user.

BRIEF DESCRIPTION OF THE SEVERAL VIEWS OF THE DRAWINGS

FIG. 1 is an exemplary illustration of a work-item as known in the art.

FIG. 2 is an exemplary illustration of a work-item notification as known in the art.

FIG. 5 depicts a non-exhaustive list of descriptive features, in accordance with an embodiment of the present invention.

DETAILED DESCRIPTION

Figure 1:
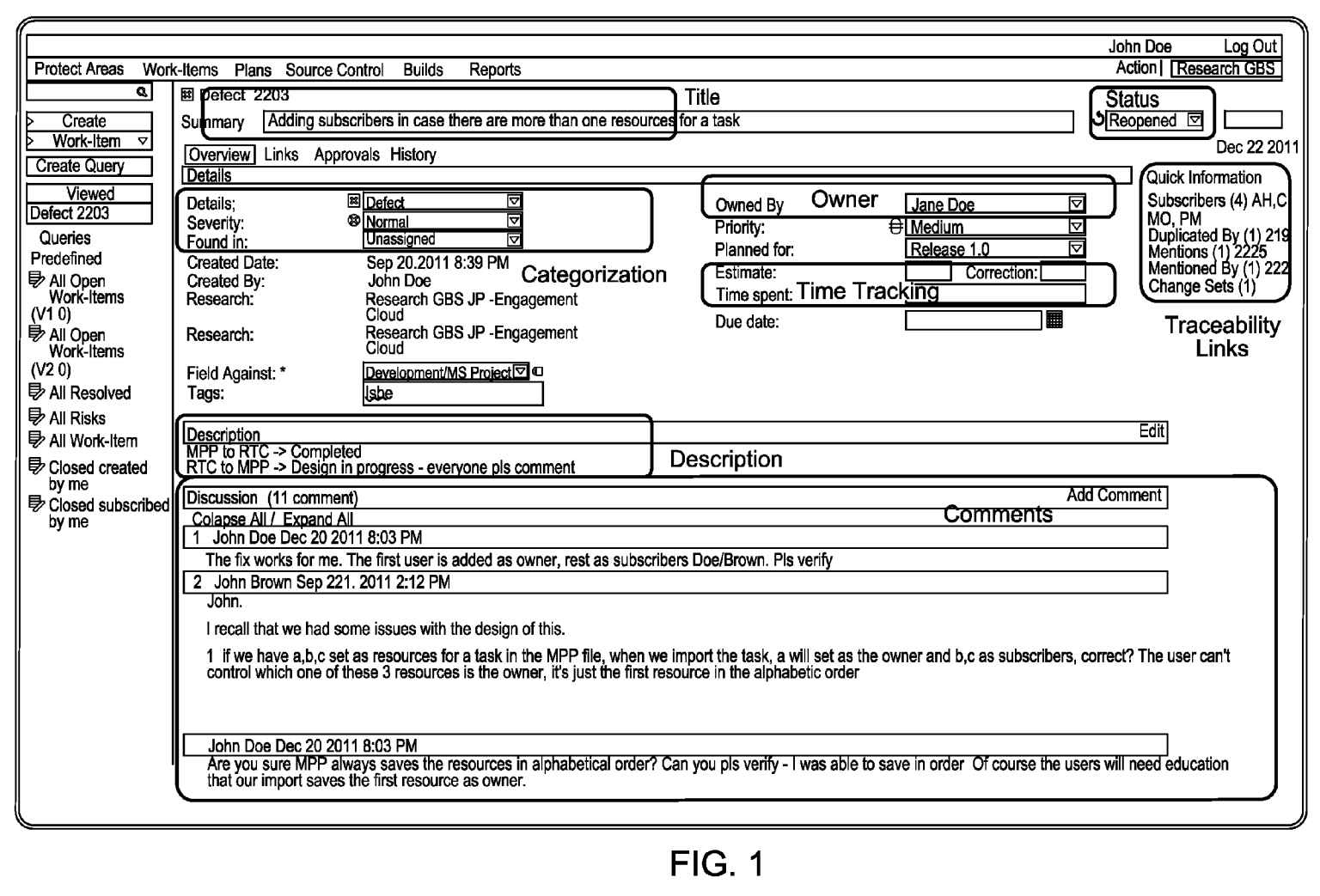
Figure 3:
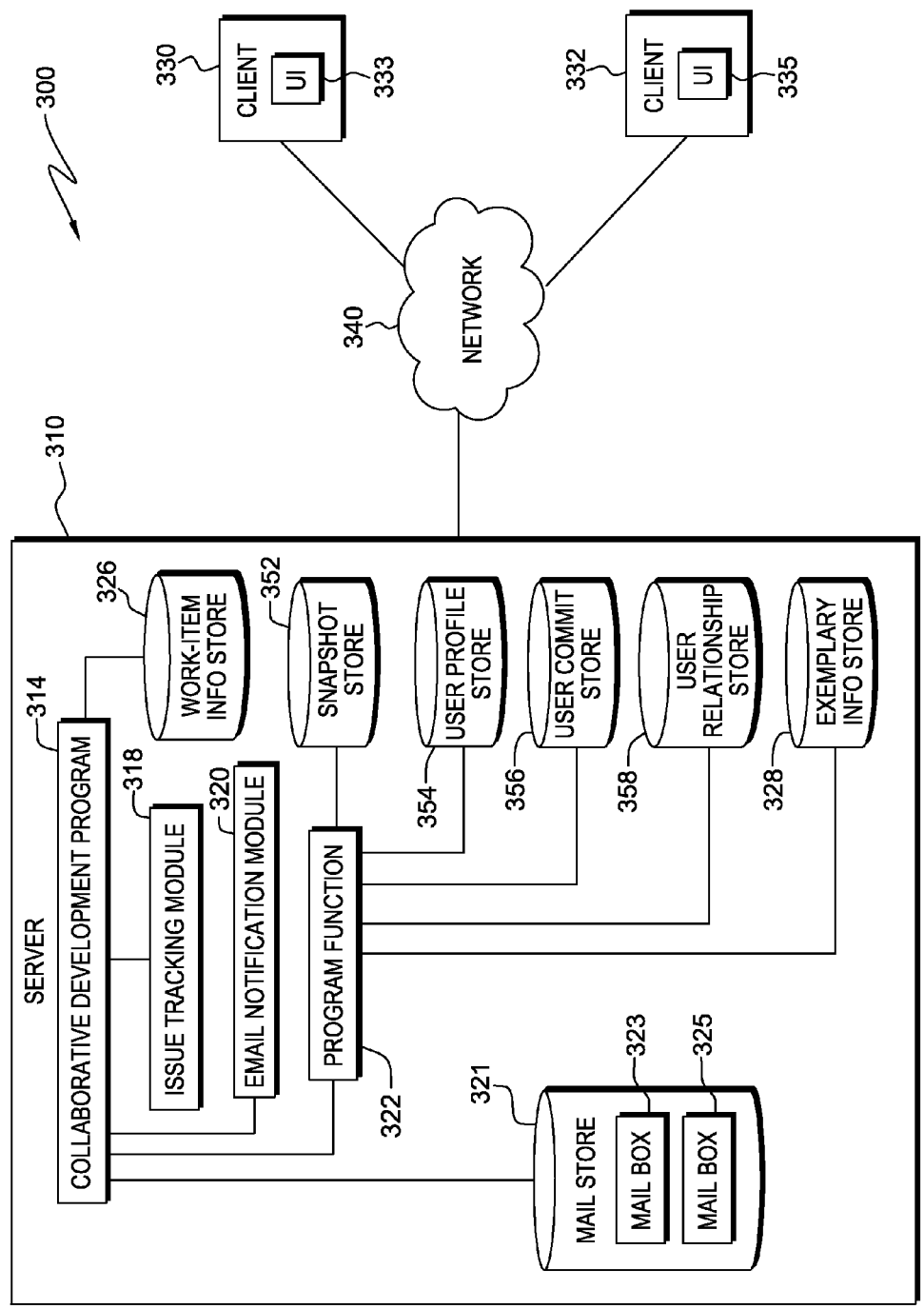
FIG. 3 is a functional block diagram of an environment, in accordance with an embodiment of the present invention.

A work-item is an artifact that represents a way of keeping track of tasks and issues that a development team needs to address during a development cycle. FIG. 1 is an exemplary illustration of a work-item generated by an issue tracking software (ITS) that includes several fields, such as, title, status indicator, owner, categorization indicator, time tracking, traceability links, description, and comments. In response to an entry/modification to a field of a work-item, the owner and/or subscribers included in the subscriber list (hereinafter "user") of the work item will receive a work-item notification. FIG. 2 is an exemplary illustration of a work-item notification. In particular, FIG. 2 depicts a listing of notifications for a user, Sedna Administrator, that relate to several work-items and span several days. Note that the user takes no action on the notification itself, but must access a work-item management tool to take action. A work-item notification allows its recipient to determine whether a response to the work-item update is necessary by the urgency implied therein.

However, the receipt of too many notifications that do not warrant any attention can be unproductive for the recipient. For example, notification overload can increase the chances of missing an important notification. This matter is particularly important for project managers, team leads or anyone who needs to be involved in multiple tasks. Furthermore, the matter can become aggravated for a user that needs to act on a work item which they do not own but subscribe to.

The present invention seeks to predict the classification of a notification and rank the notification based on the prediction. In addition, the present invention seeks to reduce the chances of an ITS transmitting unimportant notifications. Once a classification has been determined for a notification, the notification is displayed in a manner that depicts the relationship of the classification relative to other notifications. Classification involves separating notifications into to training data (prior and/or current notifications for a user) and testing data (new notifications associated with that user). Hence, the present invention predicts whether the user will act in response to the notification by learning from examples of that user's responses to similar notifications in the past.

Accordingly, portions of embodiments of the present invention must be trained (tuned) prior to their usage with the test data. The goal of the training is to produce a model, based on the training data, which predicts the classification of the test data. During training, the present invention may use a binary classification technique to predict classifications, for example, a binary classification technique that maps the training data into a higher dimensional space and finds a separating hyperplane with the maximal margin in the higher dimensional space. The binary classification technique typically can utilize different kernels, which are functions that affect the mapping. For example, kernels can include a linear kernel, a polynomial kernel, a radial basis function kernel, and a sigmoid kernel. Linear kernels linearly map data into a higher dimensional space, and therefore can handle cases where the relation between training data and test data is linear.

The present invention may use another classification technique based on whether the user takes one of a next set of actions (discussed below) and how quickly that user responds to the notification. In addition, the present invention may utilize other classification techniques to predict classifications, for example, Bayesian methods, decision tree learning, and support vector machines. Bayesian methods use Bayes' theorem to compute posteriori probabilities for a hypothesis from evidence in training data. Here, the simplest method, naive Bayes, works with the assumption that all features in the training data are conditionally independent. Decision tree learners learn easy-to-interpret tree models where leaves represent class labels and branches represent conjunctions of features that lead to those class labels. Support vector machines construct a hyperplane or set of hyperplanes in a high dimensional space in order to separate the examples of different classes. In the same vein, the present invention may use a multi-level classification technique to predict classifications, wherein the classifications include "very important", "moderately important", and "unimportant".

To begin, training data must be obtained. As such, work-item history from past and on-going projects are retrieved and formatted, for example, in terms of a <Actor, Timestamp, Attribute, Start-Value, End-Value> data structure. For each user that receives a notification, a set of features are determined that describe the notifications from that particular user's perspective. Notifications are classified as "important" or "unimportant" based the user's next action on the work-item and the user's response time.

At the conclusion of the training, a portion of an embodiment of the present invention has been trained to predict the classification of new notifications for a particular user and generate associated confidence scores, with the prediction. For example, the prediction can include the determination of which side of the hyperplane a particular notification lies, and where the confidence score relates to the distance between the constructed hyperplane and the particular set of scores. A ranked list of classifications may be generated, for example, by adjusting the confidence score relative to the time lapsed since the notification was generated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to FIGS. 3-7. FIG. 3 is a functional block diagram of an environment, generally designated 300, in accordance with an embodiment of the present invention. Environment 300 includes server 310 and clients 330 and 332, connected over network 340. Network 340 can be, for example, a local area network (LAN), a wide area network (WAN) such as the Internet, or a combination of the two, and includes wired, wireless, or fiber optic connections. In general, network 340 can be any combination of connections and protocols that will support communications between server 310 and clients 330 and 332, in accordance with an embodiment of the invention.

Server 310 and clients 330 and 332 can each be, for example, a mainframe or mini computer, a laptop, tablet, or netbook personal computer (PC), or a desktop computer. In general, server 310 and clients 330 and 332 can be any programmable electronic device capable of supporting the required functionality of an embodiment of the present invention, and as described in further detail with respect to FIG. 7.

Clients 330 and 332 represent computing devices that are used to receive and/or view work item notifications generated by a computing device included in environment 300, for example, server 310. Further, clients 330 and 332 include user interfaces 333 and 335, respectively, which allow a user to access, view, and/or respond to a work-item notification. User interfaces 333 and 335 also allow a user to generate a work-item. Clients 330 and 332 can receive, via network 340, work-item notifications from server 310. Further still, clients 330 and 332 can transmit, via network 340, work-item responses to server 310.

Server 310 is an application server that provides collaborative development applications, such as collaborative software development applications, to computer devices within environment 300, for example, clients 330 and 332, in accordance with an embodiment of the present invention. Server 310 includes collaborative development program 314 and program function 322. Server 310 can, via network 340, transmit notifications to clients 330 and 332.

Collaborative development program 314 is included in server 310 and is associated with program function 322, in accordance with an embodiment of the present invention. Collaborative development program 314 represents software that helps developers involved in a common task, for example, users of clients 330 and 332, achieve common development goals. Collaborative development program 314 includes work-item information store 326, issue tracking module (ITM) 318, email store 321, and email notification module 320, in accordance with an embodiment of the present invention.

In an embodiment, work-item information store 326 is associated with collaborative development program 314 and represents an information repository wherein past, on-going, and new work item notifications are stored. ITM 318 is associated with collaborative development program 314 and represents software that manages and maintains lists of work items and work item notifications. Further, ITM 318 generates work items and work item notifications. Email store 321 is associated with collaborative development program 314 and represents an information repository wherein work item notifications associated with users of clients 330 and 332 are stored for later retrieval by the users of clients 330 and 332.

In another embodiment, email store 321 is associated with network 340 or another computing device in communication with network 340. Further, email store 321 includes mail boxes 323 and 325 that are associated with clients 330 and 332, respectively, wherein notifications are received. As described above, each user of a work item is notified of the activities being performed on that particular work item. Email notification module 320 is in communication with collaborative development program 314 and represents software capable of transmitting work item notifications generated by ITM 318 to email store 321. In an embodiment, the functions of email notification module 320 are included in another computing device that is in communication with network 340.

In an embodiment, program function 322 is included in server 310 and is in communication with collaborative development program 314, exemplary information store 328, snapshot store 352, user profile store 354, user commit store 356, and user relationship store 358.

Program function 322 represents software capable of predicting the classification of a work item notification, in accordance to an embodiment of the present invention. In an embodiment, program function 322 predicts the classification based on whether the user takes a particular next set of actions on the work-item and how quickly the user responds. In another embodiment, program function 322 is a binary classifier that uses a binary classification technique (described above) to predict the classification of a notification.

Program function 322 retrieves, via collaborative development program 314, work-item information from work-item information store 326. Program function 322 transmits information to and retrieves information from exemplary information store 328, which is an information repository that includes unlabeled notifications. Program function 322 transmits information to and retrieves information from snapshot store 352, which is an information repository that includes information related to the state of a work item. Program function 322 transmits information to and retrieves information from user-profile store 354, which is an information repository that includes user profiles, as discussed below. Program function 322 transmits information to and retrieves information from user commit store 356, which is an information repository that includes information that reflects the number of times a user's actions are associated with a particular package. Further still, program function 322 transmits information to and retrieves information from user relationship store 358, which is an information repository that includes information that reflects the number of times a first user acts on a work-item immediately after a second user. Program function 322 can determine the relevance of a work-item notification to a user. Program function 322 can generate a user commit profile.

Figure 4:
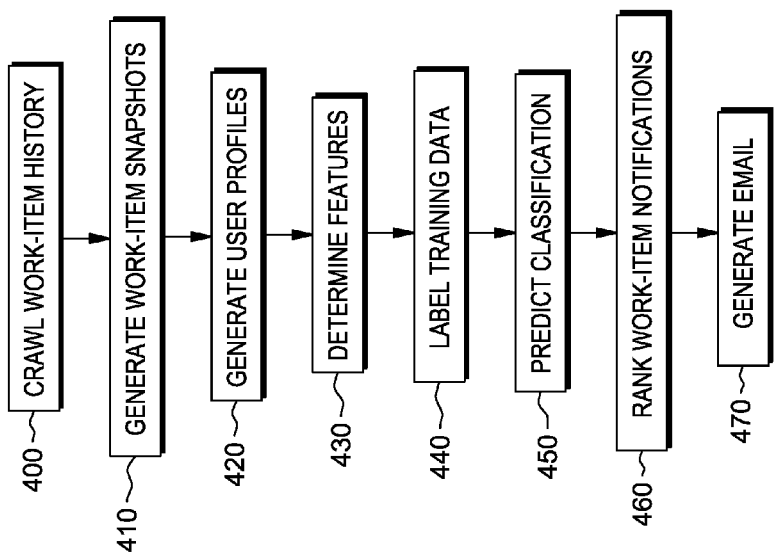
FIG. 4 illustrates operational steps of a program function, inserted on a server within the environment of FIG. 1, in accordance with an embodiment of the present invention.

FIG. 4 is a flowchart depicting the operational steps of a program function, inserted on a server computer within the environment of FIG. 3, for predicting the classification of a notification, in accordance with an embodiment of the present invention. To begin, program function 322 crawls the work-item history (step 400). For example, program function 322 retrieves, via collaborative development program 314, work item history of past and/or on-going development projects associated with the users of clients 330 and 332 from work-item information store 326. Program function 322 formats the retrieved work item history in a (id, U, T, A, S, E) data structure, wherein id is Work-itemID; U is the name of the user that created or modified the work-item; T is the timestamp of the creation or modification; A is attribute; S is work-item start value; and E is work-item end-value. Program function 322 utilizes the formatted work-item history entries to generate training data.

For each moment in the lifecycle of the work-item that an action is being performed thereon, program function 322 generates work-item snapshots (step 410), which is a description for each instance that an action is performed on the work-item. For example, utilizing formatted work-item history, program function 322, starting from the time that the work item is created, generates a description (hereinafter "snapshot") of the work item at each time instance an action is performed on the work item using formula [1].

$$WI_{(id,T)} = \{(Attribute, Value)\} \quad [1]$$

wherein id is the work-itemID and T is the timestamp for that particular the snapshot was generated. For example, a snapshot at time T is the state of a particular work item at time T.

In particular, program function 322 utilizes formula [1] to generate a time-stamped set of (Attribute, Value) pairs wherein each Attribute consists of a name and a type, which indicates whether the attribute is single-valued or multi-valued. For example, single-valued attribute types include Summary, Description, Category, Severity, Priority, Owner, Due-Date, State, and Time-Spent. Multi-valued attribute types include comments, attachments, tabs, subscribers.

During training, program function 322 determines whether snapshot store 352 includes a snapshot for a work item identified in step 400. If no snapshot exists for the identified work-item, program function 322 generates a new snapshot utilizing formula [1] above. On the other hand, if a snapshot exists, program function 322 sets the snapshot as a copy of the latest snapshot with the same id, $WI_{id,T} = WI_{id,T'}$, wherein the maximum value of T' is less than T such that snapshot store 352 includes $W_{id,T'}$, and transmits $W_{id,T}$ to snapshot store 352. Further, program function 322 updates $W_{id,T}$ by including the current action on an attribute. For example, if program function 322 determines that Attribute.type is single-valued, then program function 322 removes the attribute (if it exists) from $W_{id,T}$ and sets the attribute as the end value, E. On the other hand, if program function 322 determines that Attribute.type is multi-valued, then program function 322 adds or removes E as a value for A in $W_{id,T}$, depending on the command present in E.

Subsequently, for each timestamp where a snapshot exists, program function 322 generates a user profile (step 420) for each user and transmits work item subscriptions for the user included in step 400 at that particular time and a history of how the user responded to a work item described in step 400 to user profile store 354. A user profile for a user U at time T is represented by a set of records showing all work items the user owns/subscribes to along with the number of actions of different kinds that the user performs on those work items. For example, an exemplary user profile generated by program function 322 at time 2011-04-18T21:00:0044.041Z is depicted below in Table 1, in accordance with an embodiment of the present invention.

TABLE 1

162407, "Owned", #Comments: 1, #Tags: 1, #Status: 1, #Attachments:0, #Due-Date0, #Priority:1
162304, "Subscribed", #Comments: 4, #Tags: 3, #Status: 0, #Attachments:1, #Due-Date:1
162104, "Subscribed", #Comments: 3, #Tags: 1, #Status: 0, #Attachments:4, #Due-Date:2, #Priority: 1

To generate a user profile, program function 322 generates a record depicting the user's profile at every time-instance when an action is performed on a work item that the user owns or subscribed to. Note that work item ownership and subscription lists are described above. For example, for each ordered entry (step 400), when A is "Owned By" or "Subscribed By", program function 322 generates a new user profile record for workitemID and sets the count of each attribute to zero, for example, $U_{X,id,T}$=("Owned"/"Subscribed", #Comments: 0, #Tags: 0, #Status: 0, #Attachments: 0, #Due-Date: 0, #Time-Spent:0). On the other hand, where A is not equaled to "Owned By" or "Subscribed By", program function 322 generates a user-profile record for each of its current owner or subscribers by copying, from user-profile store 354, the user's prior user profile records for workitemID. Subsequently, program function 322 updates the generated record by increasing the count of #<A.name> by 1.

In certain embodiments, program function 322 also generates a user commit profile in a time-stamped manner, for example, using formula [2].

$$<U, T, P, C> \quad [2]$$

wherein U is userID; T is the timestamp for the profile's creation; P is Package-Name; and C, the commit count, reflects the number of times that U performed (committed) an action on a work-item associated with the Package. A user scores a commit when they take action on a work item notification. Program function 322 transmits user commit profiles to user commit store 356 for storage.

To generate user-commit information, for each formatted work item history entry, <id, T, U, A, S, E>, where A is "change-set", program function 322 determines the package name, P, from E. Subsequently, program function 322 creates a new user commit record, for example, by determining the previous record for P that user, U, may have and increasing the commit count, described above, by 1. However, if no previous record of P exists, then program function 322 generates a new record that reflects a commit count of 1, for example, <U, T, P, 1>. Program function 322 stores user commit information in user-commit store 356.

In another embodiment, program function 322 generates information reflecting a user's development relationships to another user (user-user relationship profile) using, for example, the <user-A, user-B, count> format, wherein "count" is the number of times user-A acts on a work-item immediately following user-B acting on said work-item. The higher the count number the higher the probability that user-A acts on a work-item following user-B acting thereon. For example, if the count between user-A and user-B is larger than the count between user-A and user-C, then notifications involving user-B will be predicted to have a higher importance to user-A than those involving user-C. Program function 322 transmits user-user relationship profiles to user relationship store 358 for storage.

To generate user-user relationship information, for each formatted work history entry, program function 322 determines the previous history entry for a work item, id, for example, <id, T', U', A', S', E'>, and increases the count for the user-user relation for (U, U') by 1.

For each snapshot and for each user of that snapshot, program function 322 generates a training data entry (created above) and determines features for the entry (step 430). For example, notifications and the context leading up to the notification are described from the user's perspective using a set of descriptive features, such as the non-exhaustive list of descriptive features depicted in FIG. 5 that include a list of features, related descriptions, and how to compute or locate the feature information. Each work-item history entry represents an action taken on a work-item, wherein for each action, Z, and for each user, X, of the work-item at time T, program function 322 generates a set of features, F, which represent the context behind a notification to be generated for Z to be sent to X.

Once the training data entries are generated in step 430, program function 322 labels the training data by predicting the classification of the notification, which, for example, can be determined by how much time the user requires to respond to the notification (step 440). In an embodiment, program function 322 predicts the classification of a training data entry using the binary classification technique described above. In another embodiment, program function 322 predicts that the classification of a training data entry from step 430 as being "important" or "unimportant" based on user X's action (denoted by Y) on work-item id after action Z utilizing formula [3].

$$\text{If Timestamp}(Y) - \text{Timestamp}(Z) < \beta \text{ then}$$
$$F = \text{``important''}, \text{Else } F = \text{``unimportant''} \quad [3]$$

wherein $\beta$ is a pre-determined threshold value that indicates the maximum allowable response time for an "important" notification, for example, six hours.

In another embodiment, program function 322 predicts the classification of a training data entry as "important" utilizing formula [4].

If (Is_My_Name_Present=yes) AND
   (OwnedByMe=yes) AND
   (My_Last_Action_Type="Comment") OR If (Is_My_Name_Present=no) AND (My_action_Fraction>0.45) OR If (priority="critical") AND (OwnedByMe=yes) AND
   (My_Normalized_Affinity_With_A>0.6), then
   F="Important".    [4]

In yet another embodiment, program function 322 predicts the classification of a training data entry as "unimportant" utilizing formula [5].

If (Is_My_Name_Present=no) AND
   (OwnedByMe=no) AND
   (My_last_Action_Type="Status") OR If (Is_My_Name_Present=no) AND (My_Action_Fraction<0.25), then F="unimportant".    [5]

Once the training data has been labeled, step 440, the data can be used to predict the classification of the test data, which includes new notifications (step 450). For example, for every user of a new notification, program function 322 predicts the classification of the notification by generating a confidence score, S, for example, using the related user profile, user commit, and/or user relationship information. A confidence score may be generated using statistical methods, in accordance with an embodiment of the present invention. In another embodiment, a confidence score relates to the distance between the constructed hyperplane and the particular set of scores.

Once a confidence score has been generated for the new notification, the new notification can be added to a list of new notifications for that user in terms of the notification's determined confidence score. Program function 322 determines a ranking, RankScore, for a notification (step 460). For example, RankScore can be determined by reducing the confidence score, S, by the time lapsed since the notification was generated to maintain the recency of the ranked list. Program function 322 generates an email containing the new notification (step 470), for example, if Rankscore is greater that a predetermined threshold.

Figure 6:
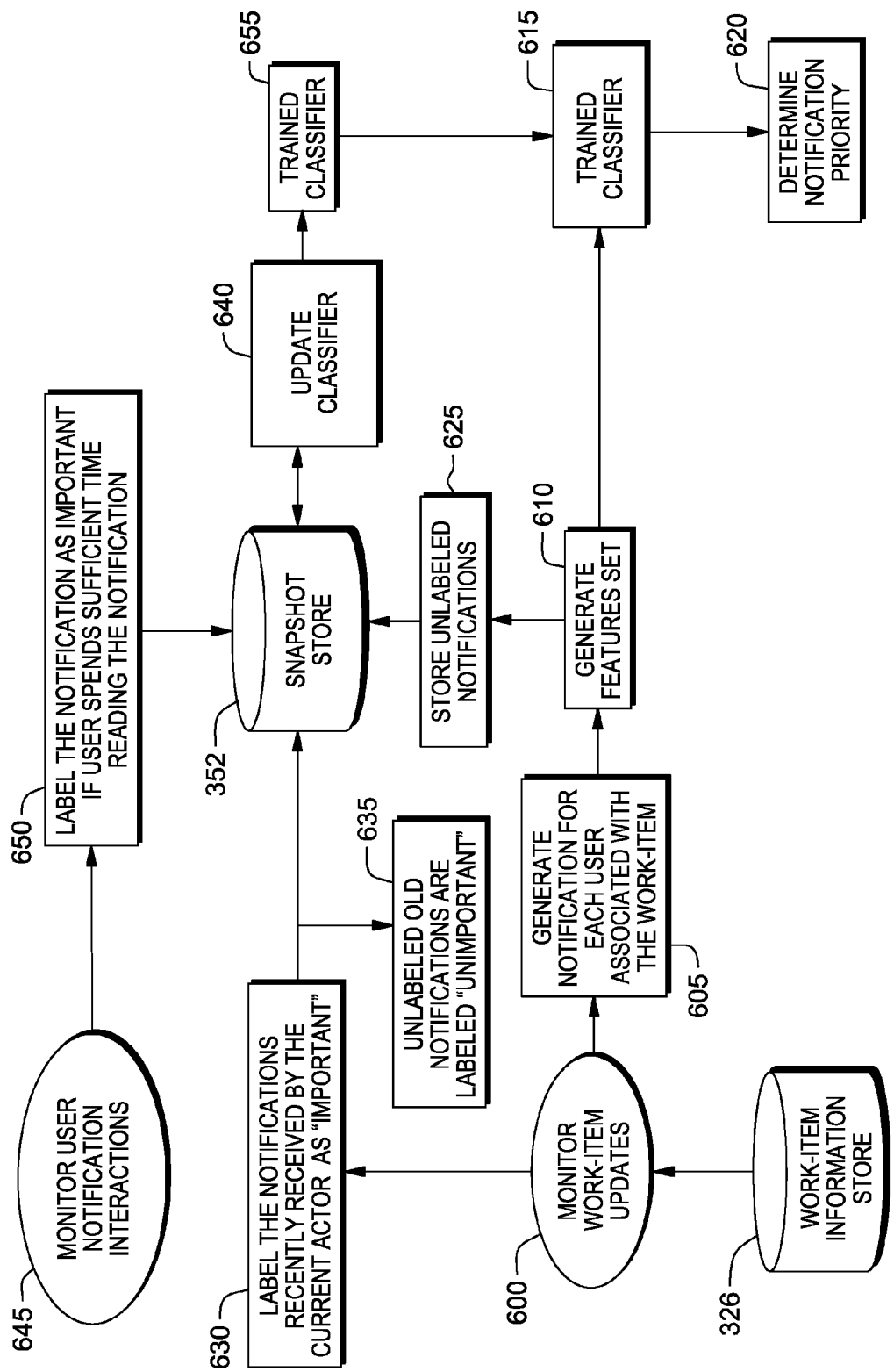
FIG. 6 illustrates operational steps of a program function, inserted on a server within the environment of FIG. 1, in accordance with an embodiment of the present invention.

FIG. 6 illustrates the operational steps of a program function, inserted on a server within the environment of FIG. 1, in accordance with an embodiment of the present invention. Program function 322 monitors work-item updates (step 600). In response to a work-item update, program function 322 generates a notification for each user associated with the work-item (step 605). For each user, program function 322 generates a set of features to describe the notification from the user's perspective (step 610). These features describe, for example, the nature of the work-item update (e.g., which attribute changed), the work-item's attributes (e.g., severity, priority), the history of the user's actions on the work-item (e.g., what fraction of total actions are executed by the user). Using such a feature-set (generated in step 610) as testing data, program function 322, when trained (step 655), can predict the classification of the notification using the trained classifier (step 615). Program function 322 determines which notifications have priority by determining which notifications were classified as being important to the user (step 620). Program function 322 generates an unlabeled notification copy of the feature-set generated in step 610 and stores the unlabeled notification, for example, in exemplary information store 328 (step 625). Such unlabeled notifications are used by program function 322 as training data.

Where a current action on a work-item is a response to a preceding update on the work-item, program function 322 predicts the classification of recently generated (defined by a threshold of recency value, for example, two days) past notification(s) from the work-item generated for the current actor to be important (step 630). In another embodiment, the number of recent notifications to be considered for classification is determined using a heuristic. Program function 322 classifies unlabeled old notifications as unimportant (step 635). For example, an old unlabeled notification is a notification generated beyond the threshold of recency value.

Program function 322 updates by retrieving notification examples from exemplary information store 328 (step 640). Program function 322 monitors user notification interactions (step 645). In an embodiment, a notification can be classified utilizing information that describes how the user interacted with the notification (e.g. the notification email or the notification entry in dashboard). For example, a notification may be labeled "important" if the notification is opened for at least a threshold amount of time, for example ten minutes, which can reflect that the user spent a sufficient amount of time reading the notification. In another embodiment, a heuristic may be utilized to predict a classification for a notification, for example, if the user deletes the notification email, then the predicted classification for the notification is unimportant.

Figure 7:
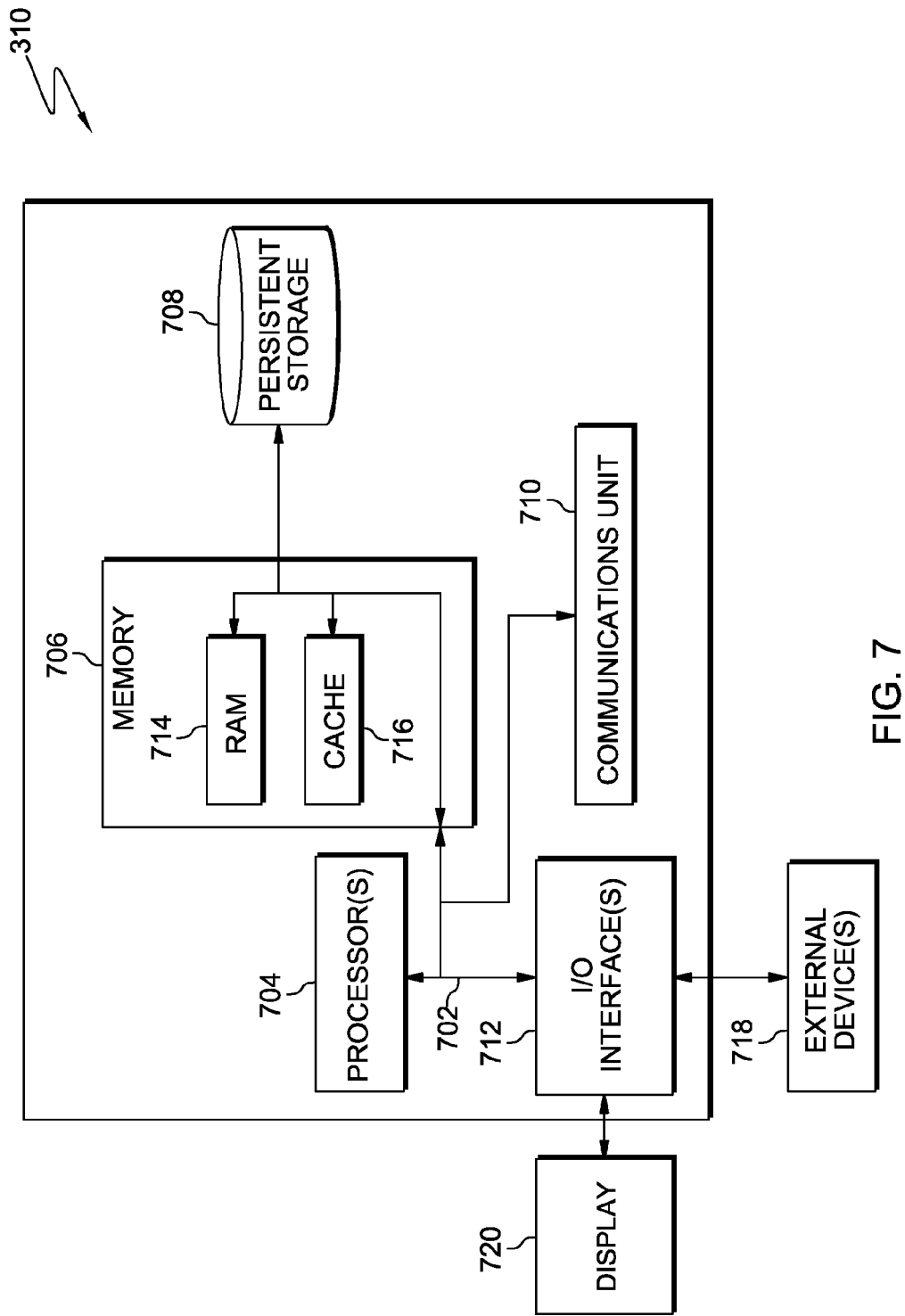
FIG. 7 depicts a block diagram of components of the server executing the program function, in accordance with an embodiment of the present invention.

FIG. 7 depicts a block diagram of components of a server, within the environment of FIG. 1, executing a program function, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Server 310 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Program function 322, exemplary information store 328, snapshot store 352, user profile store 354, user commit store 356, and user relationship store 358 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including clients 330 and 332. In these examples, communications unit 710 includes one or more network interface cards. Communications unit 710 may provide communications through the use of either or both physical and wireless communications links. Program function 322 may be downloaded to persistent storage 708 through communications unit 710.

I/O interface(s) 712 allows for input and output of data with other devices that may be connected to server 310. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., program function 322, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for predicting a classification of a work-item notification, the method comprising:

training a binary classifier using information relating to a user's responses to a plurality of past work-items notifications sent to the user;

receiving, by a device operated by the user, a plurality of new work-items notifications;

analyzing the plurality of new work-item notifications using the trained binary classifier to rank the plurality of new work-item notifications relative to each other, with the ranking being based upon a relative importance of the new work-item notifications; and displaying, on a display device, at least some of the plurality of new work-item notifications along with an indication of the relative rankings of the new work-item notifications.

2. The method of claim 1 further comprising:

determining the user's actions in response to each of the past work-item notifications based on sets of work-item snapshot(s) respectively associated with past work-items respectively associated with the past work-item notifications.

3. A computer program product for use with a set of processor(s), the computer program product comprising:

a data storage device structured and/or program to store program instructions executable by the set of processor(s); and program instructions stored in the data storage device, the program instructions including:

first program instructions programmed to train a binary classifier using information relating to a user's responses to a plurality of past work-items notifications sent to the user, second program instructions programmed to receive, by a device operated by the user, a plurality of new work-items notifications, third program instructions programmed to analyze the plurality of new work-item notifications using the trained binary classifier to rank the plurality of new work-item notifications relative to each other, with the ranking being based upon a relative importance of the new work-item notifications, and fourth program instructions programmed to display, on a display device, at least some of the plurality of new work-item notifications along with an indication of the relative rankings of the new work-item notifications.

4. The computer program product of claim 3 wherein the program instructions further include:

fifth program instructions programmed to determine the user's actions in response to each of the past work-item notifications based on sets of work-item snapshot(s) respectively associated with past work-items respectively associated with the past work-item notifications.

5. The computer system of claim 4 wherein the program instructions further include:

fifth program instructions programmed to determine the user's actions in response to each of the past work-item notifications based on sets of work-item snapshot(s) respectively associated with past work-items respectively associated with the past work-item notifications.

6. A computer system comprising:

a set of processor(s);

a data storage device structured and/or program to store program instructions executable by the set of processor(s); and program instructions stored in the data storage device, the program instructions including:

first program instructions programmed to train a binary classifier using information relating to a user's responses to a plurality of past work-items notifications sent to the user, second program instructions programmed to receive, by a device operated by the user, a plurality of new work-items notifications, third program instructions programmed to analyze the plurality of new work-item notifications using the trained binary classifier to rank the plurality of new work-item notifications relative to each other, with the ranking being based upon a relative importance of the new work-item notifications, and fourth program instructions programmed to display, on a display device, at least some of the plurality of new work-item notifications along with an indication of the relative rankings of the new work-item notifications.

* * * * *